United States Patent
Da Pont et al.

(10) Patent No.: US 10,030,329 B2
(45) Date of Patent: Jul. 24, 2018

(54) ELECTRODYNAMIC POSITION TRANSDUCER DEVICE AND A WASHING MACHINE COMPRISING SUCH A DEVICE

(75) Inventors: Paolo Da Pont, Turin (IT); Paolo Ravedati, Moncalieri (IT); Massimo Davi, Bussoleno (IT); Giorgio Carrer, Turin (IT); Nicola Grieco, Rivalta di Torino (IT); Francesco Palmisano, Turin (IT); Giuseppe Tarantino, Nemoli (IT)

(73) Assignee: ELBI INTERNATIONAL S.P.A., Turin (IT)

( * ) Notice: Subject to any disclaimer, the term of this patent is extended or adjusted under 35 U.S.C. 154(b) by 180 days.

(21) Appl. No.: 14/116,815

(22) PCT Filed: May 11, 2012

(86) PCT No.: PCT/IB2012/052357
§ 371 (c)(1),
(2), (4) Date: Nov. 11, 2013

(87) PCT Pub. No.: WO2012/153304
PCT Pub. Date: Nov. 15, 2012

(65) Prior Publication Data
US 2014/0096567 A1    Apr. 10, 2014

(30) Foreign Application Priority Data
May 12, 2011    (IT) .............................. TO2011A0422

(51) Int. Cl.
*D06F 37/20*    (2006.01)
*D06F 33/02*    (2006.01)
(Continued)

(52) U.S. Cl.
CPC ............ *D06F 37/203* (2013.01); *D06F 33/02* (2013.01); *D06F 39/087* (2013.01); *G01L 9/007* (2013.01);
(Continued)

(58) Field of Classification Search
CPC ........ G01L 9/007; G01L 9/10; A47L 15/4244; D06F 39/087; G01B 7/00; G01F 23/20; G01P 13/00; G01P 15/08; G01P 3/4802
(Continued)

(56) References Cited

U.S. PATENT DOCUMENTS 4,446,715 A * 5/1984 Bailey ................... G01L 27/005
374/1
5,760,577 A * 6/1998 Shizuya ................... G01B 7/00
177/210 EM
(Continued)

FOREIGN PATENT DOCUMENTS

DE    198 35 865 A1    2/1999
EP    1 598 466 A1    11/2005
(Continued)

OTHER PUBLICATIONS

International Search Report of PCT/IB2012/052357 dated Oct. 9, 2012.

*Primary Examiner* — Michael E Barr
*Assistant Examiner* — Tinsae B Ayalew
(74) *Attorney, Agent, or Firm* — Sughrue Mion, PLLC

(57) ABSTRACT

The device (1) comprises:
a casing (2-4) in which there is clamped a diaphragm (5) which, together with a portion of the casing (2-4), defines at least one chamber (6, 7) having a variable volume;
a winding (14);

(Continued)

an interaction member (13), adapted to magnetically interact with the winding (14) as a consequence of a displacement of the diaphragm (5), in such a way that the inductance of the winding (14) varies as a function of the relative position of the interaction member (13) with respect to the winding (14), and a processing unit (17) coupled to the winding (14), in order to supply electric signals having a parameter which is variable as a function of the inductance of the winding (14) and thus as a function of the relative position of the interaction member (13).

The processing unit (17) comprises memory means (22) adapted to store data representative of correction values which, when applied during operation to the instantaneous actual values of the parameter, allow corrected values of the parameter, corresponding to a predetermined transduction characteristic, to be obtained.

The processing unit (17) is designed to correct the instantaneous actual values of the parameter in such a way that, at least when the actual values of the parameter are lower than a predetermined value, the processing unit (17) generates and emits corrected values of the parameter which are amplified by a predetermined factor.

6 Claims, 6 Drawing Sheets

(51) Int. Cl.
*D06F 39/08* (2006.01)
*G01L 9/00* (2006.01)
*G01L 9/10* (2006.01)
*G01L 19/02* (2006.01)

(52) U.S. Cl.
CPC ................ *G01L 9/10* (2013.01); *G01L 19/02* (2013.01); *D06F 2202/085* (2013.01)

(58) Field of Classification Search
USPC ............... 177/210 EM; 324/207.15, 207.16, 324/207.22, 207.26, 234; 73/514.31, 73/514.38, 722, 728
See application file for complete search history.

(56) References Cited

U.S. PATENT DOCUMENTS

| | | | |
|---|---|---|---|
| 6,460,381 B1* | 10/2002 | Yoshida et al. | ............... 68/12.04 |
| 7,180,285 B2* | 2/2007 | Bindocci et al. | ......... 324/207.15 |
| 2004/0083834 A1 | 5/2004 | Endo et al. | |

FOREIGN PATENT DOCUMENTS

| | | |
|---|---|---|
| EP | 2 199 770 A2 | 6/2010 |
| GB | 2 262 363 A | 6/1993 |
| WO | 03/056289 A1 | 7/2003 |
| WO | 03/078951 A1 | 9/2003 |

* cited by examiner

ELECTRODYNAMIC POSITION TRANSDUCER DEVICE AND A WASHING MACHINE COMPRISING SUCH A DEVICE

CROSS REFERENCE TO RELATED APPLICATIONS

This is a National Stage of International Application No. PCT/IB2012/052357 filed May 11, 2012, claiming priority based on Italian Patent Application No. TO2011A000422 filed May 12, 2011, the contents of all of which are incorporated herein by reference in their entirety.

The present invention relates to an electrodynamic position transducer device which can be used, for example, as a pressure transducer in a washing machine, particularly for the detection of the washing bath level in the washing chamber or tub.

The invention relates more specifically to a transducer device comprising
- a hollow rigid casing in which there is clamped a diaphragm which, together with a portion of the casing, defines at least one chamber having a variable volume;
- at least one winding;
- an interaction member, adapted to magnetically interact with the winding as a consequence of a displacement of the diaphragm, in such a way that the inductance of the winding varies as a function of the relative position of the member with respect to the winding, and
- processing means coupled to the aforesaid winding and adapted to supply, during operation, electric signals having a parameter, such as for example a voltage, which is variable as a function of the inductance of the winding and thus as a function of the relative position of the interaction member;
- said processing means comprising memory means adapted to store data representative of correction values which, when applied during operation to the instantaneous actual values of the parameter, allow corrected values of the parameter, corresponding to a predetermined transduction characteristic, to be obtained.

An example of an electrodynamic position transducer device of this type is described in U.S. Pat. No. 7,180,285.

German patent application DE 19835865 A1 describes a washing machine, particularly a washing machine for laundry, with a washing chamber and a drum having a horizontal axis, and with an electrodynamic position transducer connected to the washing chamber or tub and used in a synergistic way both to detect the washing bath level in the washing chamber or tub and to detect the amplitude of the vibrations or oscillations of the washing chamber with respect to the supporting structure of the machine.

The solution described in the German application DE 19835865 is not suitable for use in washing machines in which the washing chamber or tub and the associated washing drum are suspended in a configuration with a substantially vertical axis. In a machine of this type, the voltage signal which can be supplied by an electrodynamic position transducer device of the type defined above has a rather extensive range of variation, owing to the variations in the level of the washing bath, and therefore the level of the washing bath can be detected with a high degree of resolution. On the other hand, the range of variation of the signal due to the vibrations or oscillations of the washing chamber or tub is very small, and therefore the signal is difficult to analyse by means of an electronic unit in the washing machine.

One object of the present invention is therefore to provide an electrodynamic position transducer device of the type defined initially which is improved in such a way that it enables the aforementioned limitations of the prior art solutions to be overcome, by allowing the amplitude of the vibrations or oscillations of a washing chamber with a vertical axis to be detected with an adequate degree of resolution.

This and other objects are achieved according to the invention with an electrodynamic position transducer device of the type defined initially, whose salient characteristic is that the aforesaid processing means are designed to correct the instantaneous actual values of the aforesaid parameter in such a way that, at least when the actual values of the parameter are lower than a predetermined value, the processing means generate and emit corrected values of the parameter which are amplified by a predetermined factor.

In a first embodiment, the processing means have an input for a control signal assuming two values or states, and are designed to generate and emit amplified corrected values of the parameter when the control signal assumes a predetermined value or state.

In another embodiment, the processing means are designed to generate and emit amplified corrected values of the parameter only when its instantaneous actual values are lower than a predetermined value, and to generate and emit corrected values of the parameter, multiplied by a further predetermined factor (which may be as small as 1), when the instantaneous actual values of the parameter are greater than the predetermined value.

A further object of the present invention is a washing machine with a washing chamber and washing drum having an axis which is at least approximately vertical, and comprising an electrodynamic position transducer device, as defined in Claim 5 and the following claims.

Further characteristics and advantages of the invention will be made clear by the following detailed description, provided purely by way of non-limiting example, with reference to the appended drawings, in which.

Figure 1:
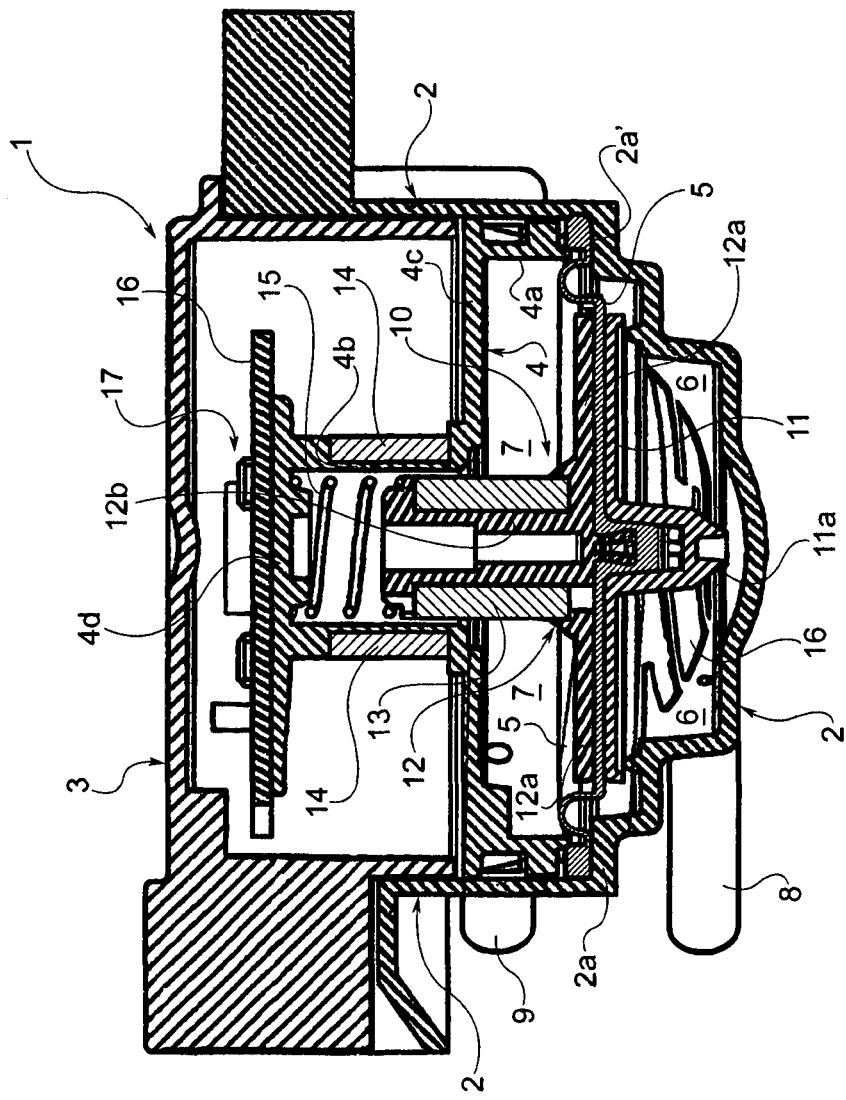
FIG. 1 is a cross-sectional view of an electrodynamic position transducer which can be used as a pressure transducer.

In FIG. 1, the number 1 indicates the whole of an electrodynamic position transducer according to the present invention.

In the embodiment illustrated by way of example, the transducer device 1 is adapted to operate as a pressure transducer.

The transducer device 1 comprises a rigid casing formed by a first substantially bowl-shaped member 2, and by a second essentially cup-shaped member 3, partially interpenetrating with the bowl-shaped member 2.

Inside the transducer casing 1, between the members 2 and 3, there is interposed a supporting body indicated as a whole by 4. This body has an annular lower portion 4a and a tubular upper portion 4b, joined together by an annular transverse wall 4c.

The tubular portion 4b of the supporting body 4 has one end closed by a terminal wall 4d.

The number 5 indicates a resilient diaphragm, made for example from an elastomeric material. The periphery of this diaphragm is clamped in a fluid-tight way between the annular lower portion 4a of the supporting body 4 and a shoulder 2a of the bowl-shaped body 2.

This diaphragm divides the region between the lower part of the bowl-shaped body 2 and the supporting body 4 into two chambers of variable volume, indicated by 6 and 7.

The bowl-shaped member 2 of the casing of the transducer has a tubular connector 8 for the introduction of a first fluid into the chamber 6, and a second tubular connector 9 which communicates with the surrounding environment. In operation, the instantaneous position of the diaphragm 5 depends (for example) on the difference between the pressure levels present in chambers 6 and 7.

The central portion of the diaphragm 5 is connected to a movable element indicated as a whole by 10. This movable element comprises a plate 11 having a central protuberance 11a fastened by snap-fitting (and with the interposition of the membrane 5) to the head portion 12a of an essentially mushroom-shaped body 12.

The plate 11 extends into the chamber 6, while the mushroom-shaped body 12 extends into the chamber 7. This body 12 has a tubular stem or shank 12b around which an annular cylindrical member 13, made of ferromagnetic material, is positioned.

The stem or shank 12b of the body 12 and the associated interaction member made of ferromagnetic material 13 extend partially axially into the upper tubular portion 4b of the supporting body 4. A winding 14 of insulated electrical wire is placed around this portion 4b of the body 4.

In the illustrated embodiment, a helical spring 15 is interposed between the terminal wall 4d of the supporting body 4 and the free end of the stem or shank 12b of the body 12. A further spring 16, of essentially conical shape, is positioned in the chamber 6 between the plate 11 and the lower wall of the bowl-shaped body 2.

Figure 3:
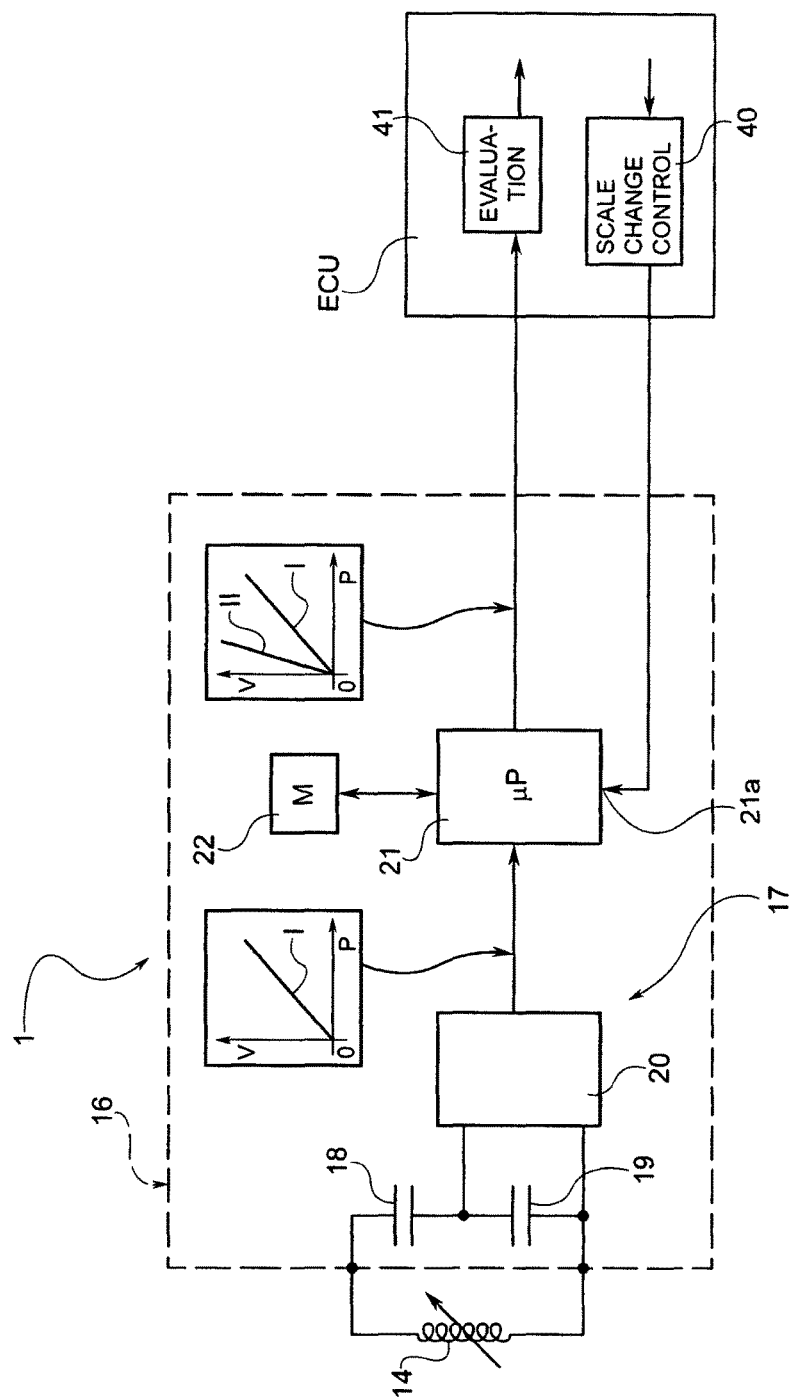
FIG. 3 is a circuit diagram, partially in block form, showing the circuit part of an embodiment of a transducer device according to the invention.
Figure 5:
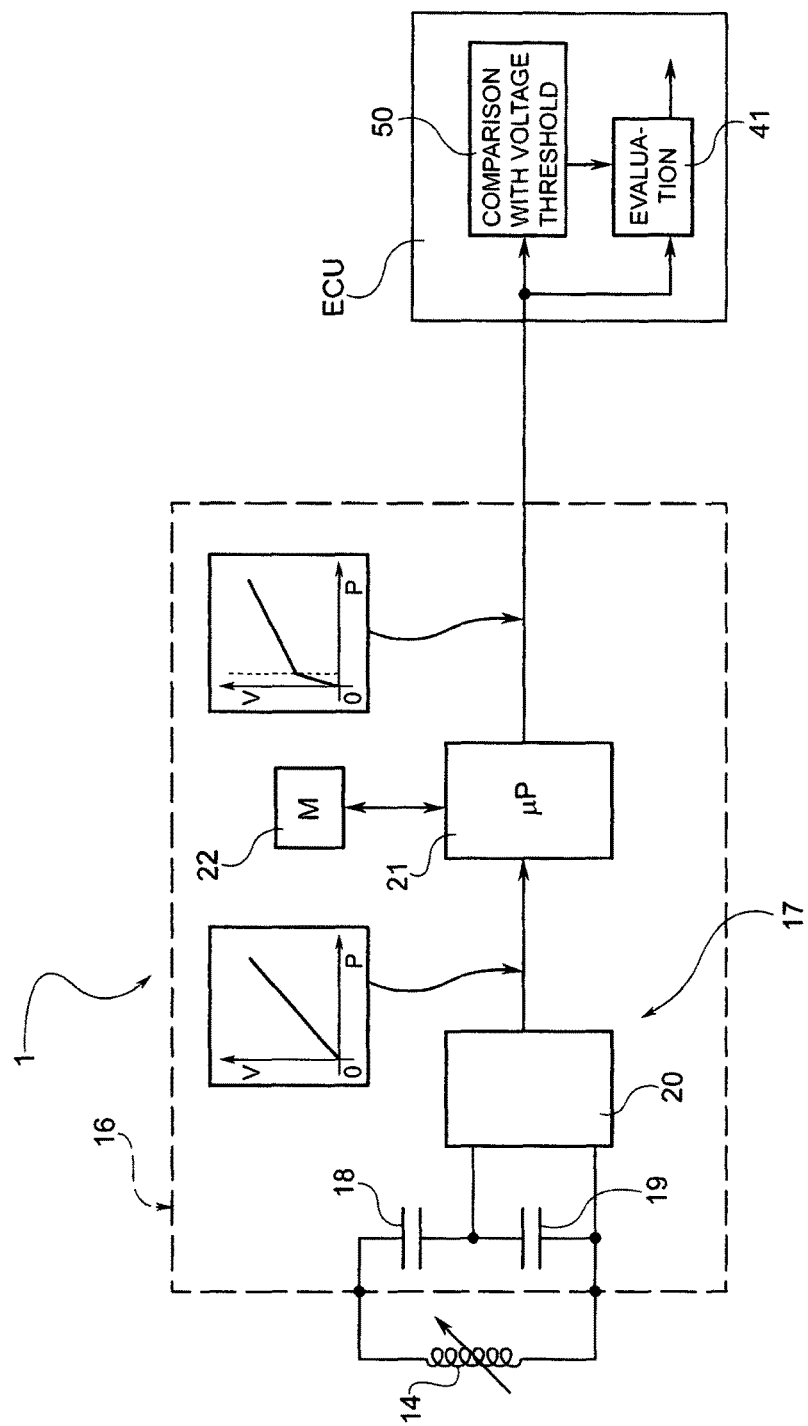
FIG. 5 is a circuit diagram, partially in block form, of a variant embodiment of a transducer device according to the invention.

A circuit board 16, carrying components and circuits indicated as a whole by 17 in FIGS. 1, 3 and 5, is fastened to the terminal wall 4d of the supporting body 4, on the opposite side from the diaphragm.

The winding 14 is connected to these circuits.

When the device is operated as a pressure transducer, the instantaneous position of the diaphragm 5 depends on the difference between the fluid pressures existing in chambers 6 and 7. If there is a variation in this difference, the moving element 10 moves axially relative to the winding 14. As the coupling between the ferromagnetic member 13 and this winding 14 varies, the inductance of the latter also varies.

The tubular connector 8 can be connected to what is known as an "air trap" mounted in a known way in the washing chamber or tub in a washing machine, in order to detect in a definitive way the level of the washing bath in the chamber or tub.

As shown schematically in FIGS. 3 and 5, the circuits 17 supported on the board 16 comprise, for example, two capacitors 18 and 19 coupled to the winding 14, with which they form an LC circuit. This LC circuit is connected to a circuit 20 of a known type which, during operation, generates an electrical signal having a parameter, such as a voltage, which is variable as a function of the inductance of the winding 14, and thus as a function of the position of the interaction member 13, and, ultimately, of the pressure in the chamber 6.

The circuit 20 can be designed to generate in a known way an electrical signal whose frequency is variable as a function of the inductance of the winding 14, and then to convert this frequency to a voltage which is correspondingly variable as a function of the inductance of the winding.

Figure 2:
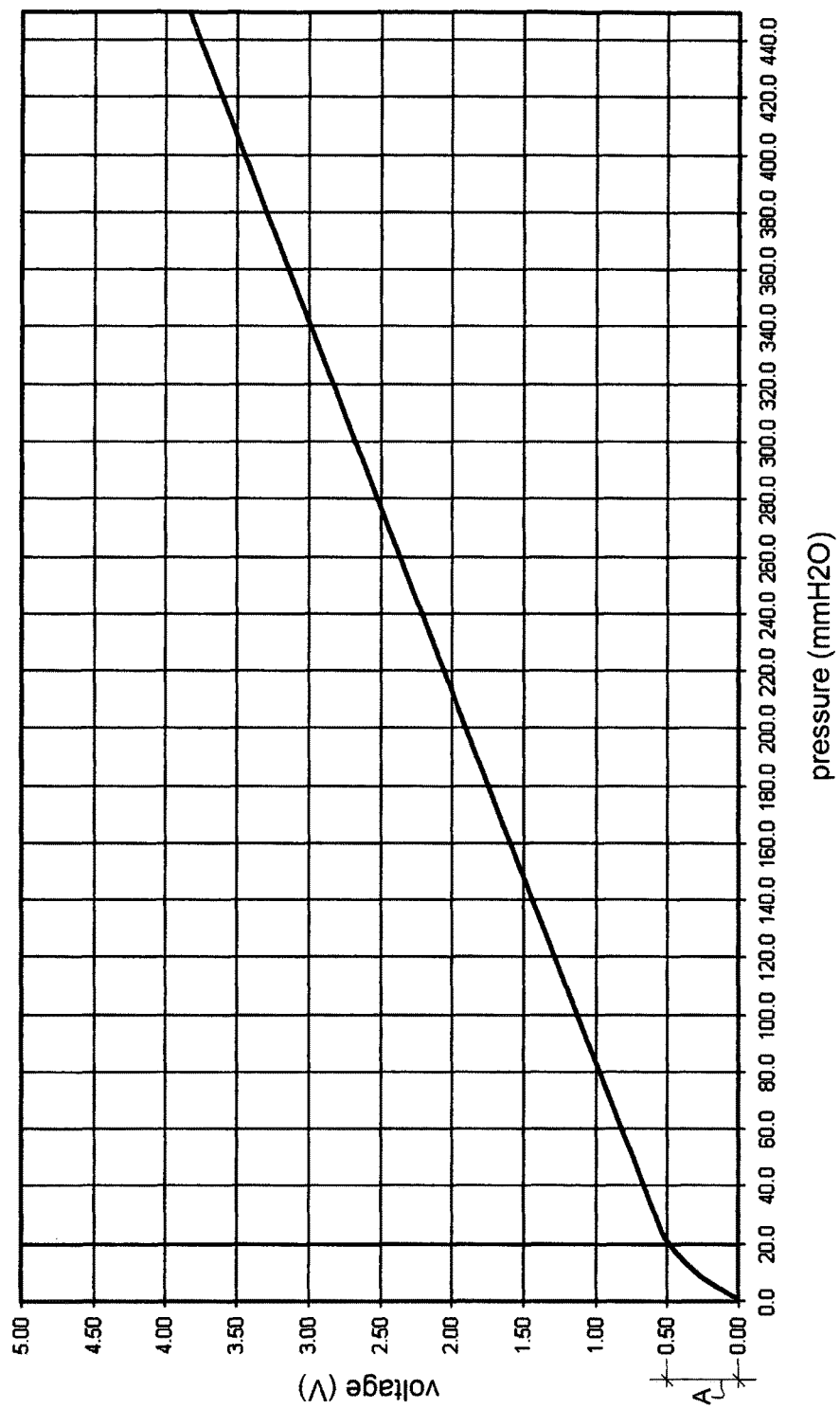
FIG. 2 is a graph showing in a qualitative way the variation of a voltage/pressure characteristic of a transducer according to FIG. 1.

At the time of manufacture, the transducer 1, when assembled, has a voltage/pressure transduction characteristic of the type shown in FIG. 2. This characteristic usually differs from one example of a transducer to the next, as a result of mechanical and electrical tolerances. It is therefore necessary to provide, in a known way, for the calibration of the transducers, in such a way that they all have the same desired value of the transduction characteristic.

If a transducer device of this type is used in a washing machine having a drum which is rotatable about a substantially vertical axis, for the purpose of detecting in a synergistic way the amplitude of the vibrations of the washing chamber or tub in the spinning phases and the level of the washing bath in the chamber or tub according to the teachings of the German patent application cited above, a problem arises in that the effect of the aforesaid vibrations is manifested in an output voltage of the transducer device which is variable over a restricted range, such as the range indicated by A in FIG. 2.

This range does not enable the amplitude of the vibrations to be detected with an acceptable degree of resolution.

In order to overcome this drawback, in the embodiment shown schematically in FIG. 3, the circuits 17 associated with the transducer 1 comprise a microprocessor-based processing device 21 associated with non-volatile memory devices 22.

In the embodiment shown in FIG. 3, the processing device 21 has an input 21a connected to a control circuit 40 of an electronic unit ECU of the washing machine with which the transducer device 1 is associated.

The processing device 21 has its output connected to an evaluation device 41 of the unit ECU.

The control circuit 40 of the control unit ECU receives at one input signals or data indicative of the current phase of the washing cycle carried out in the washing machine. On the basis of these data, the control circuit 40 sends to the input 21a of the processing device 21 a signal which assumes a first value or state when a spinning phase is in progress, and a second value or state when the phase which is in progress is a phase of soaking, washing or rinsing, or more generally a phase in which water is present in the washing chamber or tub.

If the signal applied to the input 21a assumes the first value or state, the processing device 21 corrects the instantaneous actual values of the voltage obtained from the circuit 20, by amplifying them according to a predetermined factor, for example a factor equal to 4. The corrected values generated in this way are emitted towards the evaluation device 41 of the unit ECU.

As a result of the correction and amplification described above, during a spinning phase the electrodynamic transducer 1 appears to have an "amplified" characteristic, such as that indicated by I in FIG. 3, instead of the characteristic II shown in FIG. 3.

If the signal at the input 21a assumes the aforesaid second value or state, in other words during the phases of soaking, washing or rinsing, the processing device 21 does not carry out the amplification described above (or, if it does carry out this amplification, does so by a smaller multiplication factor), and therefore the voltage obtained from the transducer device 1 and present at the input of the evaluation device 41 of the electronic control unit ECU varies substantially according to the normal characteristic I of FIG. 3 (or according to a characteristic obtained therefrom by multiplication by the aforesaid second amplification factor).

Because of the characteristics described above, the characteristic exhibited by the transducer 1 during the spinning phase has a wider range of variation and enables the amplitude of the vibrations or oscillations of the washing chamber or tub to be detected with a greatly improved resolution.

Conversely, in the soaking, washing or rinsing phases, in which the transducer 1 is used as a detector of the washing bath level, the range of variation of the voltage signal supplied by the transducer 1 is more than adequate in its existing state.

Figure 4:
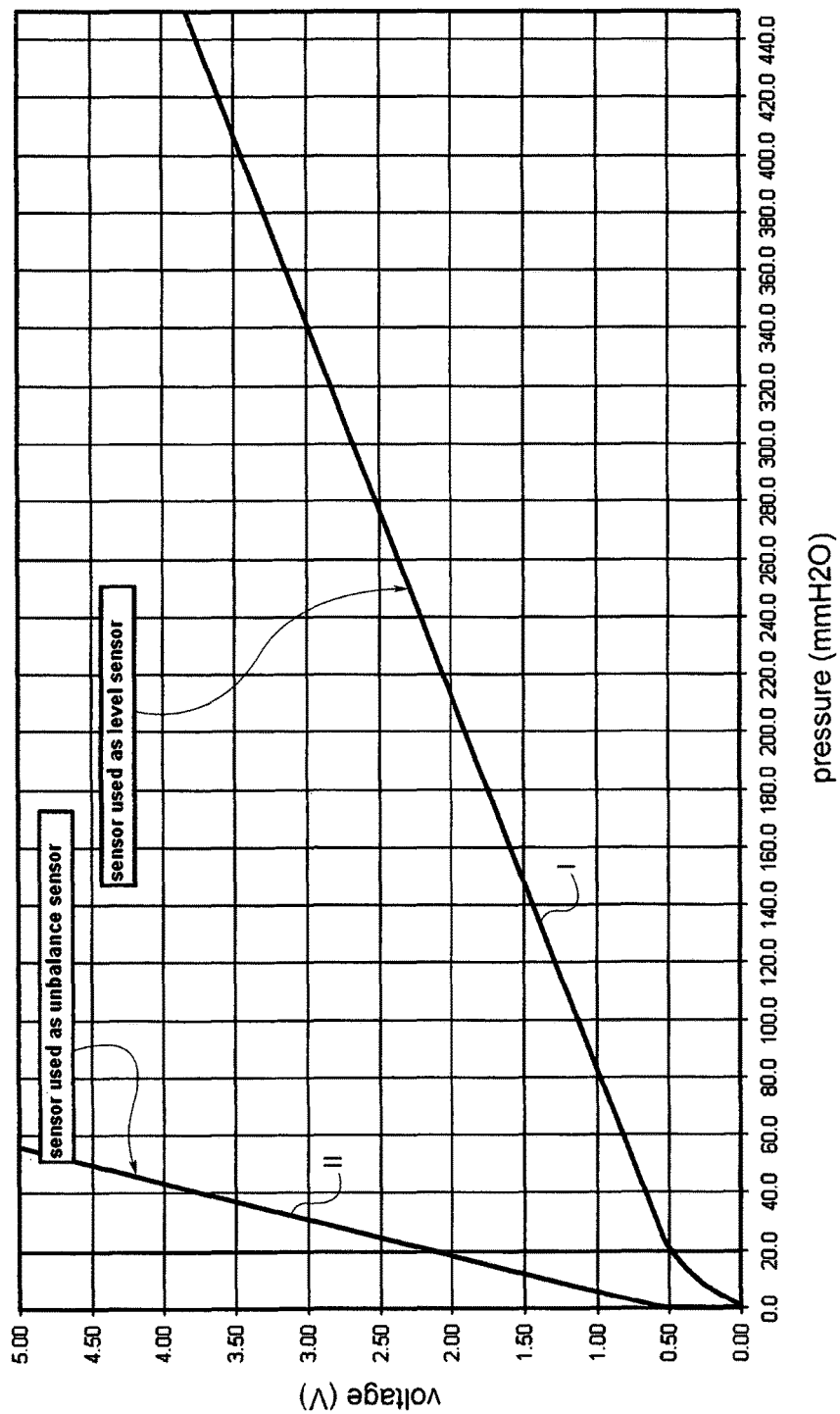
FIG. 4 is a diagram similar to that of FIG. 2, and shows the voltage/pressure characteristics of a transducer device according to FIG. 3.

Conveniently, the memory devices 22 associated with the individual transducers 1 are made to store values for correcting the voltage supplied at the output of the circuit 20, making it possible to calibrate these transducers to give them all the same desired transduction characteristics, while also making it possible to switch between the characteristics I and II shown in FIGS. 3 and 4.

FIG. 5 is a schematic illustration of a variant embodiment. In this drawing, parts and members which have already been described are given the same alphanumeric references as those used previously.

The variant shown in FIG. 5 is based on the fact that, in a spinning phase, the vibrations or oscillations of the washing chamber or tub of a washing machine with a substantially vertical axis of rotation cause the transducer device 1 to generate a voltage which is typically less than a predetermined value, being for example equal to 0.5 V in the schematic graph of FIG. 2.

In the embodiment according to FIG. 5, the processing device 21 is designed in such a way that, when the voltage supplied to it by the circuit 20 is less than the predetermined value, this processing device 21 corrects and amplifies this voltage by a predetermined factor, for example a factor equal to 4. On the other hand, if the voltage supplied by the circuit 20 is greater than the predetermined value, the processing device 21 generates and emits corrected voltage values which are multiplied by a further predetermined factor which is less than the first factor, and may be as small as unity.

Figure 6:
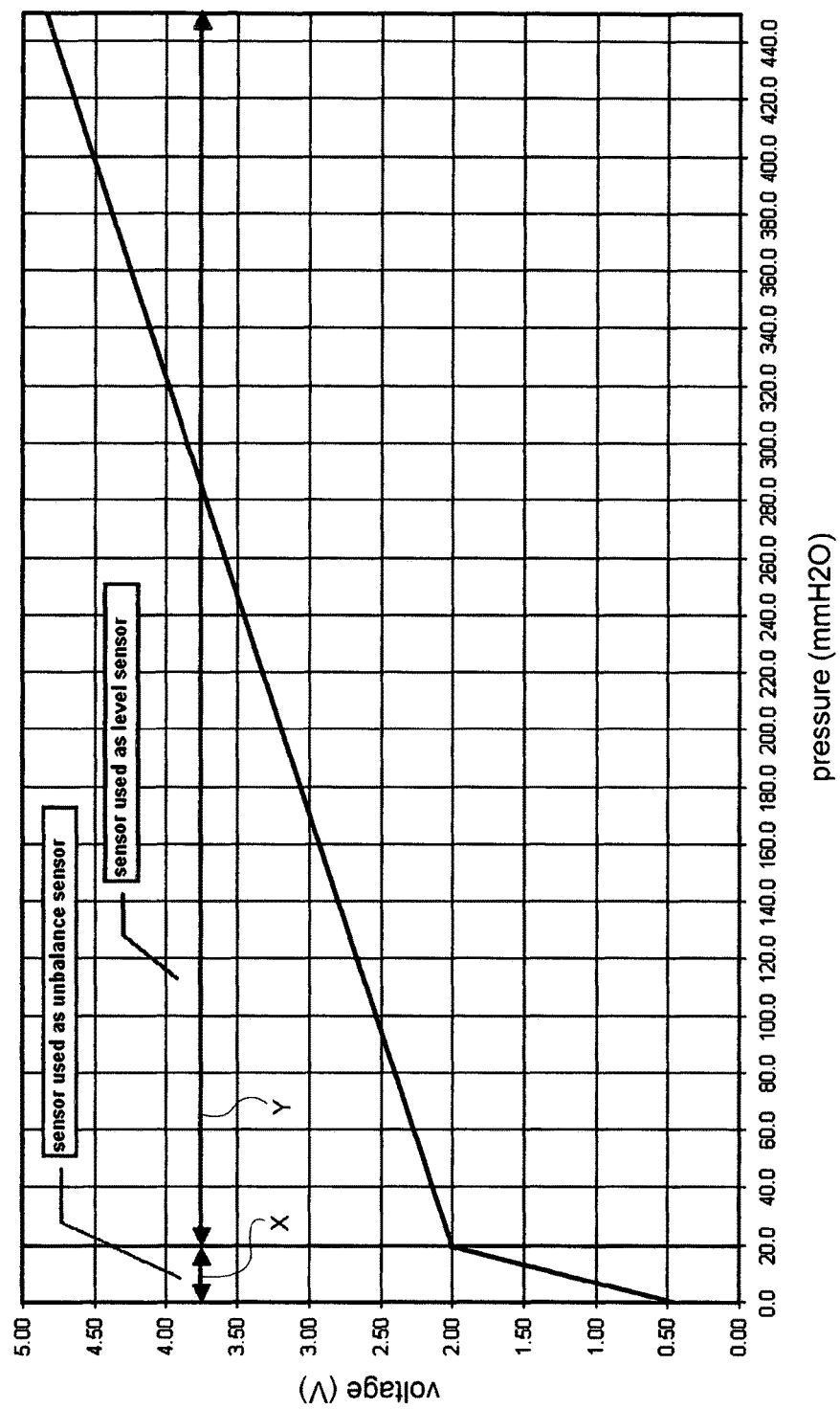
FIG. 6 is a graph similar to those of FIGS. 2 and 4, and shows the voltage/pressure characteristic of the transducer device according to FIG. 5.

Consequently, at the output of the processing device, the signal supplied by the transducer 1 as a whole has a voltage/pressure characteristic of the type shown in FIG. 6, and therefore varies in the form of a broken curve, with a range X in which the voltage is highly amplified for the determination of the amplitude of the vibrations of the washing chamber or tub with a good degree of resolution, and with a second range y in which it is relatively less amplified (or possibly not amplified at all), for the detection of the washing bath level.

In a corresponding way, the electronic unit ECU of the washing machine comprises a voltage threshold comparator circuit 50, which receives the signal supplied from the output of the processing device 21. Depending on whether this signal is smaller or greater than a predetermined value (equal to 2 V in the characteristic shown by the broken curve in FIG. 6, at a point corresponding to the change of direction of this characteristic), the evaluation device 41 receives information according to which the voltage signals which it receives from the transducer 1 are to be interpreted either as indicative of the amplitude of the oscillations of the washing chamber or as indicative of the washing bath level in this washing chamber or tub.

Naturally, the principle of the invention remaining the same, the forms of embodiment and the details of construction may be varied widely with respect to those described and illustrated, which have been given purely by way of non-limiting example, without thereby departing from the scope of the invention as defined by the attached claims.

The invention claimed is:

1. A washing machine, comprising:
a resiliently suspended washing chamber;
a drum mounted in the washing chamber and rotatable about an axis; and
an electrodynamic position transducer connected to the washing chamber for detecting level of a washing bath in the washing chamber and amplitude of vibrations or oscillations of the washing chamber, and coupled to an electronic control unit of the machine, designed to evaluate the signals or data generated and emitted during operation by the transducer so as to derive, from the signals or data, information selectively indicative either of the amplitude of the vibrations or oscillations of the washing chamber, or of the level of the washing bath in the washing chamber,
wherein the electrodynamic position transducer comprises:
a hollow rigid casing in which there is clamped a diaphragm which, together with a portion of the casing, defines at least one chamber having a variable volume;
at least one winding;
an interaction member, adapted to magnetically interact with the winding as a consequence of a displacement of the diaphragm, in such a way that the inductance of the winding varies as a function of the relative position of the interaction member with respect to the winding, and
a processor coupled to the winding and supplying electric signals having a parameter which is variable as a function of the inductance of the winding and thus as a function of the relative position of the interaction member;
wherein the drum is rotatable about an at least approximately vertical axis, and
wherein said processor comprises a memory storing data representative of correction values which, when applied during operation to the instantaneous actual values of the parameter, allow corrected values of the parameter, corresponding to a predetermined transduction characteristic, to be obtained, said processor correcting the instantaneous actual values of said parameter in such a way that, at least when the actual values of the parameter are lower than a predetermined value, the processor generates and emits corrected values of the parameter which are amplified by a predetermined factor,
wherein the transducer is operable to selectively assume:
a first condition in which the transducer detects the level of the washing bath in the washing chamber according to a first transduction characteristics, or
a second condition in which the transducer detects the amplitude of the vibrations or oscillations of the washing chamber according to a second transduction characteristic amplified by said predetermined factor,
wherein said data representative of correction values comprise data corresponding to the first transduction characteristic and data corresponding to the second transduction characteristic.

2. The washing machine according to claim 1, wherein the processor has an input for a control signal assuming two values or states, and generates and emits amplified corrected values of the parameter when the control signal assumes a predetermined value or state.

3. The washing machine according to claim 1, wherein the processor generates and emits amplified corrected values of the parameter only when the instantaneous actual values of the parameter are lower than a predetermined value, and generates and emits corrected values of the parameter multiplied by a further predetermined factor, when the instantaneous actual values of the parameter are greater than the predetermined value.

4. The washing machine according to claim 1, wherein the processor has an input for a control signal assuming two values or states, and generates and emits amplified corrected values of the parameter when the control signal assumes a predetermined value or state, wherein the control unit comprises a control circuit or device adapted to receive signals or data indicative of the current phase of a washing cycle, and to supply the processor of the transducer with a control signal having the predetermined value or state when a spinning phase is being carried out.

5. The washing machine according to claim 1, wherein the processor generates and emits amplified corrected values of the parameter only when the instantaneous actual values of the parameter are lower than a predetermined value, and generates and emits corrected values of the parameter multiplied by a further predetermined factor, when the instantaneous actual values of the parameter are greater than the predetermined value, wherein the electronic control unit (ECU) of the machine comprises
   a threshold comparator comparing the values of the parameter emitted by the transducer with the predetermined value, and
   evaluation means coupled to said comparator to selectively interpret the values of the parameter emitted by the transducer either as indicative of the amplitude of the vibrations or oscillations of the washing chamber, or as indicative of the level of the washing bath in said washing chamber, depending on whether the values of the parameter emitted by the transducer are lower or greater than the predetermined value.

6. The washing machine according to claim 3, wherein the further factor is less than the first factor.

\* \* \* \* \*